(12) United States Patent
Koskinen et al.

(10) Patent No.: US 12,707,393 B2
(45) Date of Patent: Aug. 11, 2026

(54) POWER SAVING IN WIRELESS COMMUNICATION NETWORKS

(71) Applicant: Nokia Technologies Oy, Espoo (FI)

(72) Inventors: Jussi-Pekka Koskinen, Oulu (FI); Samuli Heikki Turtinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 295 days.

(21) Appl. No.: 18/402,789

(22) Filed: Jan. 3, 2024

(65) Prior Publication Data

US 2024/0259944 A1 Aug. 1, 2024

(30) Foreign Application Priority Data

Jan. 31, 2023 (FI) ..................................... 20235084

(51) Int. Cl.
*H04W 52/02* (2009.01)

(52) U.S. Cl.
CPC ............................... *H04W 52/0235* (2013.01)

(58) Field of Classification Search
CPC ................................................ H04W 52/0235
See application file for complete search history.

(56) References Cited

U.S. PATENT DOCUMENTS 10,182,400 B2 1/2019 Khazanov et al.
10,841,876 B2 11/2020 Bhattad et al.
2018/0242248 A1 8/2018 Huang et al.
2019/0342833 A1 11/2019 Astrom et al.
2020/0022081 A1 1/2020 Ljung et al.
2020/0145921 A1 5/2020 Zhang et al.
2020/0344695 A1 10/2020 Wang et al.
2022/0201610 A1 6/2022 Wilhelmsson et al.
2022/0201649 A1 6/2022 Cox et al.
2024/0397422 A1* 11/2024 Martin ............. H04W 52/0235

(Continued)

FOREIGN PATENT DOCUMENTS

WO 2018/063340 A1 4/2018
WO 2022/266036 A1 12/2022

OTHER PUBLICATIONS

Extended European Search Report received for corresponding European Patent Application No. 23219700.4, dated Jun. 1, 27, 2024, 7 pages.

(Continued)

*Primary Examiner* — Won Tae C Kim
(74) *Attorney, Agent, or Firm* — Carter, DeLuca & Farrell LLP

(57) ABSTRACT

According to an example aspect of the present invention, there is provided a terminal device comprising at least one processor and at least one memory comprising a computer program code, wherein the at least one memory and the computer program code are configured to, with the at least one processor, cause the terminal device to obtain, via a first radio entity in the terminal device, a configuration for receiving a wake-up signal from a wireless network node and monitor, via a second radio entity in the terminal device, the wake-up signal from the wireless network node based on at least one of a configuration or an indication from the first radio entity, wherein the first and second radio entities are different.

18 Claims, 6 Drawing Sheets

610

Obtaining by a terminal device, via a first radio entity in the terminal device, a configuration for receiving a wake-up signal from a wireless network node

620

Monitoring by the terminal device, via a first radio entity in the terminal device, the wake-up signal from the wireless network node based on at least one of the configuration or an indication from the first radio entity, wherein the first and second radio entities are different

(56) References Cited

U.S. PATENT DOCUMENTS

2025/0142474 A1* 5/2025 Cheng ............... H04W 52/0235

OTHER PUBLICATIONS

"New SID: Study on low-power Wake-up Signal and Receiver for NR", 3GPP TSG RAN meeting #94e, RP-213645, Agenda: 8A.1, vivo, Dec. 6-17, 2021, 4 pages.
"Motivation for new study item on ultra-low power wake up signal in Rel-18", 3GPP TSG RAN Rel-18 workshop, RWS-210168, Agenda: 4.3, vivo, June 28-Jul. 2, 2021, 13 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications—Amendment 3: Wake-Up Radio Operation", IEEE Computer Society, IEEE Std 802.11ba™-2021, Oct. 8, 2021, 180 pages.
"IEEE 802.11a-1999", Wikipedia, Retrieved on Dec. 27, 2023, Webpage available at : https://en.wikipedia.org/wiki/IEEE_802.11a-1999.
"IEEE 802.11g-2003", Wikipedia, Retrieved on Dec. 27, 2023, Webpage available at : https://en.wikipedia.org/wiki/IEEE_802.11g-2003.
"IEEE 802.11n-2009", Wikipedia, Retrieved on Dec. 27, 2023, Webpage available at : https://en.wikipedia.org/wiki/IEEE_802.11n-2009.
"IEEE 802.11ac-2013", Wikipedia, Retrieved on Dec. 27, 2023, Webpage available at : https://en.wikipedia.org/wiki/IEEE_802.11ac-2013.
"IEEE 802.11", Wikipedia, Retrieved on Dec. 1, 2023, Webpage available at : https://en.wikipedia.org/wiki/IEEE_802.11.
"3rd Generation Partnership Project; Technical Specification Group Radio Access Network; NR; Physical channels and modulation (Release 17)", 3GPP TS 38.211, V17.3.0, Sep. 2022, pp. 1-136.
"3rd Generation Partnership Project; Technical Specification Group Radio Access Network; NR; Physical layer procedures for control (Release 17)", 3GPP TS 38.213, V17.3.0, Sep. 2022, pp. 1-260.
"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.
"Discussion on L1 signal design and procedure for low power WUS", 3GPP TSG RAN WG1 #111, R1-2211546, Agenda: 9.13.3, Spreadtrum Communications, Nov. 14-18, 2022, 8 pages.
Office action received for corresponding Finnish U.S. Appl. No. 20/235,084, dated Jun. 6, 2023, 8 pages.

* cited by examiner

POWER SAVING IN WIRELESS COMMUNICATION NETWORKS

RELATED APPLICATION

This application claims priority from, and the benefit of, Finnish Application No. 20235084, filed on Jan. 31, 2023, the contents of which is incorporated herein by reference in its entirety.

FIELD

Various example embodiments relate in general to wireless communication networks and more specifically, to device power saving in such networks.

BACKGROUND

Terminal devices of wireless communication networks typically have limited power. Hence, saving power of terminal devices is important in various wireless communication networks, such as, in cellular networks operating according to Long Term Evolution, LTE, and/or 5G radio access technology. In addition, saving power of terminal devices is also important in non-cellular networks, like Wireless Local Area Networks, WLANs. In general, there is a need to enhance power saving of terminal devices of wireless communication networks.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided a terminal device comprising at least one processing core, at least one memory including computer program code, the at least one memory and the computer program code being configured to, with the at least one processing core, cause the terminal device at least to obtain, via a first radio entity in the terminal device, a configuration for receiving a wake-up signal from a wireless network node and monitor, via a second radio entity in the terminal device, the wake-up signal from the wireless network node based on at least one of a configuration or an indication from the first radio entity, wherein the first and second radio entities are different.

Example embodiments of the first aspect may comprise at least one feature from the following bulleted list or any combination of the following features:

- wherein the first radio entity is a main radio of the terminal device for communicating with the wireless network node and the second radio entity is a radio receiver for receiving the wake-up signal from the network;
- wherein the at least one memory and the computer program code are further configured to, with the at least one processing core, cause the terminal device at least to acquire, by the second radio entity, the configuration and/or indication from the first radio entity;
- wherein the at least one memory and the computer program code are further configured to, with the at least one processing core, cause the terminal device at least to manage, based on the indication, the monitoring of the wake-up signal at the second radio entity;
- wherein the indication comprises an ON command;
- wherein the at least one memory and the computer program code are further configured to, with the at least one processing core, cause the terminal device at least to initiate, at the second radio entity, the monitoring of the wake-up signal when the ON command is indicated by the indication;
- wherein the at least one memory and the computer program code are further configured to, with the at least one processing core, cause the terminal device at least to continue, at the second radio entity, the monitoring of the wake-up signal until an OFF command is indicated by another indication or a new configuration is received;
- wherein the configuration comprises at least one of monitoring occasion information for the wake-up signal, beacon monitoring information for the wake-up signal or synchronization signal information for the wake-up signal;
- wherein the at least one memory and the computer program code are further configured to, with the at least one processing core, cause the terminal device at least to communicate, from the first radio entity to the second radio entity, information indicative of releasing of the configuration and stop, at the second radio entity, the monitoring of the wake-up signal based on the information;
- wherein the at least one memory and the computer program code are further configured to, with the at least one processing core, cause the terminal device at least to communicate the information indicative of releasing of the configuration when the terminal device performs at least one of cell selection or reselection, transits into CONNECTED mode, INACTIVE mode or IDLE mode or obtains system information indicating the disabling of wake-up signal;
- wherein the at least one memory and the computer program code are further configured to, with the at least one processing core, cause the apparatus at least to communicate, between the first radio entity and the second radio entity, via at least one of physical, medium access control or radio resource control layer of the terminal device or the first radio entity;
- wherein the at least one memory and the computer program code are further configured to, with the at least one processing core, cause the apparatus at least to communicate, between the first radio entity and the second radio entity, via at least one of physical, medium access control or radio resource control layer of the first radio entity without specifying layer information on the second radio entity;
- wherein the communication is performed when the terminal device is in one of IDLE mode, INACTIVE mode, or CONNECTED mode;
- wherein the at least one memory and the computer program code are further configured to, with the at least one processing core, cause the apparatus at least to receive, by the first radio entity, the configuration and transmit the configuration from the first radio entity to the second radio entity.

According to a second aspect of the present invention, there is provided a method, comprising obtaining by a terminal device, via a first radio entity in the terminal device, a configuration for receiving a wake-up signal from a wireless network node and monitoring by the terminal device, via a second radio entity in the terminal device, the wake-up signal from the wireless network node based on at least one of a configuration or an indication from the first radio entity, wherein the first and second radio entities are different.

According to a third aspect of the present invention, there is provided a terminal device, comprising means for obtaining, via a first radio entity in the terminal device, a configuration for receiving a wake-up signal from a wireless network node and means for monitoring, via a second radio entity in the terminal device, the wake-up signal from the wireless network node based on at least one of a configuration or an indication from the first radio entity, wherein the first and second radio entities are different.

According to a fourth aspect of the present invention, there is provided a non-transitory computer readable medium having stored thereon a set of computer readable instructions that, when executed by at least one processor, cause an apparatus to at least perform the method. According to a fifth aspect of the present invention, there is provided a computer program comprising instructions which, when the program is executed by an apparatus, cause the apparatus to carry out the method.

EXAMPLE EMBODIMENTS

Embodiments of the present disclosure provide improvements for saving power in cellular communication networks. More specifically, embodiments of the present disclosure enable power savings at least for a terminal device comprising a first radio entity, like a main radio, and a second radio entity, like a Wake Up Receiver, WUR. The second radio entity may exploited to keep the first radio entity in a power-saving state, like a deep sleep or OFF state, as long as possible, because the second radio entity may wake up the first radio entity when needed. In some example embodiments, the first radio entity may control the second radio entity such that the second radio entity does not need to monitor a radio channel for a Wake-Up Signal, WUS, if such monitoring is not needed. Therefore, further power savings are enabled for the terminal device, as monitoring for the WUS may be performed by the second radio entity in an efficient manner. In general, a wake-up signal may refer to the WUS, a WUS beacon or a WUS synchronization signal. That is, even though the WUS is used as an example in various example embodiments, the example embodiments of the present disclosure may be applied similarly for any wake-up signal, like the WUS beacon or the WUS synchronization signal.

Figure 1:
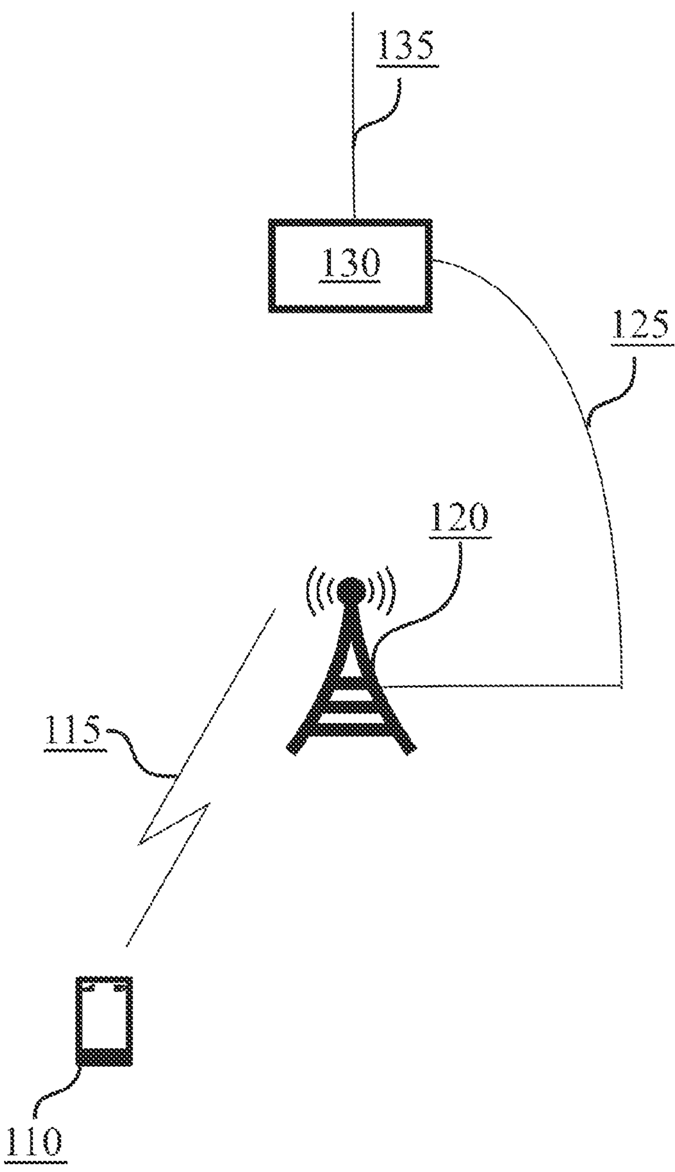
FIG. 1 illustrates an example of a network scenario in accordance with at least some example embodiments.

FIG. 1 illustrates an example of a network scenario in accordance with at least some example embodiments. According to the example scenario of FIG. 1, there may be a communication system, which comprises terminal device 110, wireless network node 120 and core network element 130. Terminal device 110 may be a wireless terminal device, like a User Equipment, UE. Terminal device 110 may comprise, or be incorporated into, for example a smartphone, a cellular phone, a Machine-to-Machine, M2M, node, Machine-Type Communications, MTC, node, an Internet of Things, IoT, node, a car telemetry unit, a laptop computer, a tablet computer or, indeed, any kind of suitable wireless terminal, station or a relay.

In the example network scenario of FIG. 1, terminal device 110 may communicate wirelessly with wireless network node 120 via air interface 115. Air interface 115 may be a beam-based interface. That is, terminal device 110 and wireless network node 120 may communicate using one or more beams.

Air interface 115 between terminal device 110 and wireless network node 120 may be configured in accordance with a Radio Access Technology, RAT, which both terminal device 110 and wireless network node 120 are configured to support. Examples of cellular RATs include Long Term Evolution, LTE, New Radio, NR, which may also be known as fifth generation, 5G, radio access technology and MulteFire. On the other hand, examples of non-cellular RATs comprise Wireless Local Area Network, WLAN, and Worldwide Interoperability for Microwave Access, WiMAX.

For example in the context of LTE, wireless network node 120 may be referred to as eNB while wireless network node 120 may be referred to as gNB in the context of NR. In some example embodiments, wireless network node 120 may be referred to as a Transmission and Reception Point, TRP, or control multiple TRPs that may be co-located or non-co-located. In case of non-cellular RATs, wireless network node 120 may be referred to as an access point. In some example embodiments, wireless network node 120 may refer to a relay.

In any case, example embodiments of the present disclosure are not restricted to any particular wireless technology. Instead, example embodiments may be exploited in any wireless communication system, wherein WUSs and WURs are used. For instance, example embodiments may be exploited in 5G/NR networks standardized by 3rd Generation Partnership Project, 3GPP, and/or in WLANs, like networks operating at least partly according to Institute of Electrical and Electronics Engineers, IEEE, 802.11ba-standard. That is, terminal device 110 and wireless network node 120 may be configured to operate according to at least one standard specification specified by the 3GPP and/or IEEE.

Wireless network node 120 may be connected, directly or via at least one intermediate node, with core network 130 via interface 125. Core network 130 may be, in turn, coupled via interface 135 with another network (not shown in FIG. 1), via which connectivity to further networks may be obtained, for example via a worldwide interconnection network. Wireless network node 120 may be connected, directly or via at least one intermediate node, with core network 130 or with another core network.

In some example embodiments, the network scenario may comprise a relay node instead of, or in addition to, terminal device 110 and/or wireless network node 120. Relaying may be used for example when operating on millimeter-wave frequencies. One example of the relay node may be an Integrated Access and Backhaul, IAB, node. The IAB node may be referred to as a self-backhauling relay as well.

Another example of a relay may be an out-band relay. In general, the relay node may comprise two parts:

1) Distributed Unit, DU, part which may facilitate functionalities of wireless network node 120, such as a gNB. Thus, in some example embodiments, the DU part of a relay may be referred to as wireless network node 120 and the DU may perform tasks of wireless network node 120;
2) Mobile Termination, MT, part which may facilitate functionalities of terminal device 110, i.e., a backhaul link which may be the communication link between a parent node (DU), such as a DU part of wireless network node 120, and the relay, such as an IAB node. In some example embodiments, the MT part may be referred to as terminal device 110 and perform tasks of terminal device 110.

In some example embodiments, power saving of terminal device 110 may be enhanced. For example, power saving of 5G NR UE may be enhanced through the use of a low-power WUR and WUS. WURs and WUSs may be exploited to further reduce power consumption of terminal device 110 as well as to reduce the latency while keeping power consumption of terminal device 110 similar to what may be achieved with, e.g., extended Discontinous Reception, eDRX. Reduction of power consumption of terminal device 110 may be enhanced by combining the use of a low-power WUR with periodic monitoring while reduced latency may be achieved by using the low-power WUR with continuous or more frequent wake-up monitoring than with eDRX (for the same UE power consumption).

Figure 2:
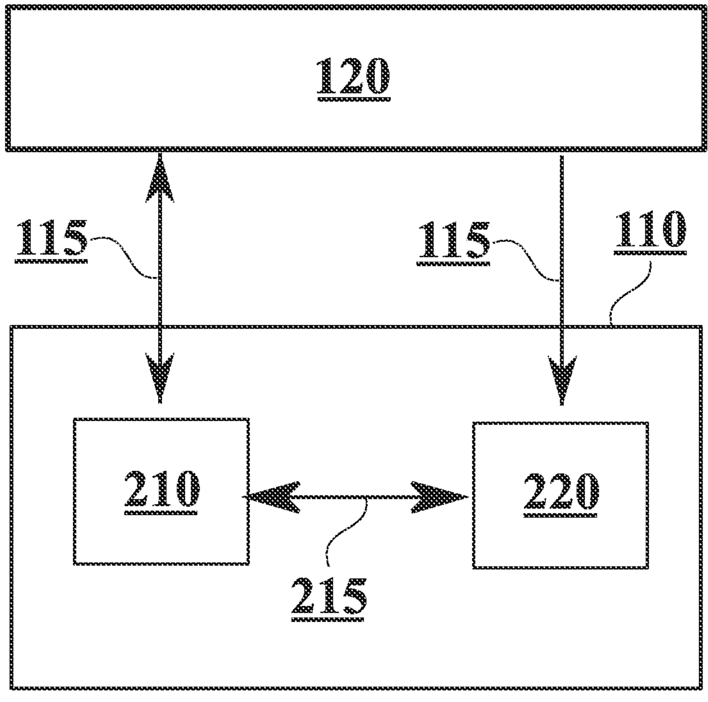
FIG. 2 illustrates an example arrangement in accordance with at least some example embodiments.

FIG. 2 illustrates an example arrangement in accordance with at least some example embodiments. In the example arrangement of FIG. 2, terminal device 110, air interface 115 and wireless network node 120 of FIG. 1 are illustrated. In addition, terminal device 110 may comprise first radio entity 210, interface 215 and second radio entity 220. Interface 215 may be a link a between first radio entity 210 and second radio entity 220 within terminal device 110. For instance, first radio entity 210 and second radio entity 220 may be interconnected by electrical leads internal to terminal device 110. First radio entity 210 and second radio entity 220 may hence interact, i.e., communicate, via interface 215. Communication may comprise receiving and transmitting.

First radio entity 210 may be a radio transceiver while second radio entity 220 may be a radio receiver. That is, first radio entity 210 may communicate with wireless network node 120 wirelessly over air interface 115 but second radio entity 220 may only receive from wireless network node 120 wirelessly over air interface 115, not transmit to wireless network node 120.

For instance, first radio entity may be an NR transceiver of a UE while second radio entity 220 may be an NR receiver, without having a capability to transmit. In some example embodiments, first radio entity 210 may be a main radio of terminal device 110 while second radio entity 220 may be a WUR. First radio entity 210 may be the main radio of terminal device 110 and configured for communication between terminal device 110 and wireless network node 120. Second radio entity 220 may be a radio receiver configured for receiving a WUS from wireless network node 120. First radio entity 210 may be different than second radio entity 220. That is, first radio entity 210 may be separate from second radio entity 220 within terminal device 110. First radio entity 210 and second radio entity 220 may be independent radios.

First radio entity 210 may be in a power-saving state, like a deep sleep or a OFF state while second radio entity 220 may perform monitoring and be configured to turn on first radio entity 210 when second radio entity receives a WUS from wireless network node 120. Second radio entity 220 may monitor the WUS. For example, second radio entity 220 may monitor a wireless channel, like a downlink control channel, such as a Physical Downlink Control Channel, PDCCH, paging Downlink Control Information, DCI, or WUS/PEI for the WUS. The monitoring may be based at least on an indication received from first radio entity 210 over interface 215 and hence, first radio entity 210 may control the monitoring of second radio entity 220 for the WUS.

Turning on first radio entity 210 enables paging monitoring and/or system information change monitoring and/or cell reselection evaluation and/or starting communications with wireless network node 120. In some example embodiments, power consumption of terminal device 110 may be minimized by using second radio entity 220, like a WUR, when needed and keeping first radio entity 210, like an NR transceiver, in the power-saving state as much as possible. Interface 215 may be exploited to transmit the indication from first radio entity 210 to second radio entity 220, to enable keeping second radio entity 220 on when needed with proper configuration from first radio entity 210. First radio entity 210 and second radio entity 220 may use the same processor, or different processors. Second radio entity 220 may not use any processor.

Second radio entity 220 may have significantly lower power consumption than first radio entity 210, like a regular NR receiver, to obtain power saving with second radio entity 220. Power saving may be achieved for example with a simple receiver structure designed solely for monitoring and detecting of WUS.

Figure 3:
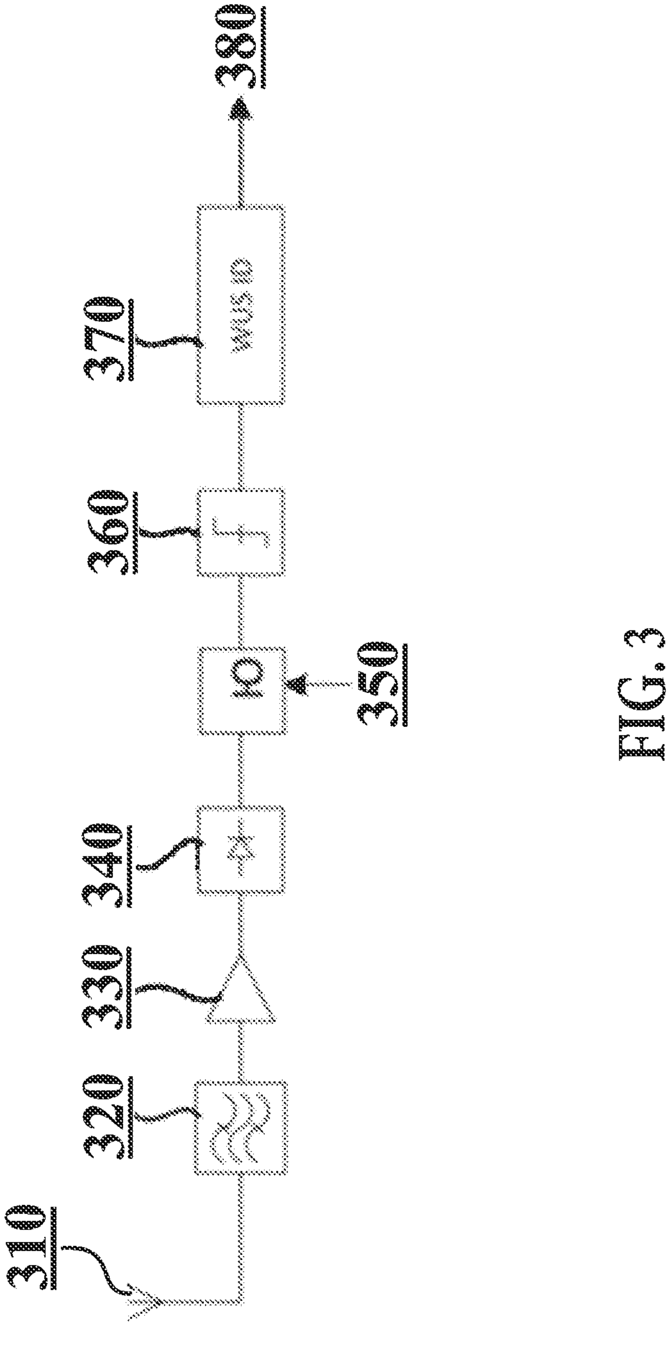
FIG. 3 illustrates an example wireless receiver in accordance with at least some example embodiments.

FIG. 3 illustrates an example wireless receiver in accordance with at least some example embodiments. The example wireless receiver illustrated in FIG. 3 may be second radio entity 220 of FIG. 2. The example wireless receiver may be suitable for receiving a WUS from wireless network node 120. A signal, such as a signal based on using On-Off Keying, OOK, may be provided from receive antenna 310 to band-pass filter 320 and from band-pass filter 320 further to low-noise amplifier 330. From low-noise amplifier 330 the signal may be provided to envelope detector 340 and from envelope detector 340 further to integrator 350. Integrator 350 may be configured to reset at a symbol time interval. Integrator 350 may provide its output to comparator 360. Comparator 360 may in turn provide its output to correlator 370.

Correlator 370 may detect whether a specific WUS, like a WUS addressing terminal device 110, has been detected. If the WUS is detected and terminal device 110 is configured to respond to the detected, specific WUS, then signal 380 may be provided to switch on a wireless transceiver, like first radio entity 210 illustrated in FIG. 2, which may be the main radio of terminal device 110.

In some example embodiments, after envelope detector 340 the signal may be a low frequency signal being either low, when a 0 is received, or high, when a 1 is received. By integrating the signal over each symbol duration, the signal noise may be suppressed and comparator 360 may then determine if the received symbol is a 0 or 1 by comparing the received symbol with an average signal level. In correlator 370 the detected bit sequence may be correlated with the expected signal.

Furthermore, in some example embodiments, second radio entity 210 illustrated in FIG. 2 may be configured for WUS monitoring in an efficient manner. For instance, first radio entity 210 illustrated in FIG. 2 may control when second radio entity 220 shall monitor a wireless channel for a WUS. Terminal device 110 may obtain, via first radio entity 210 in terminal device 110, a configuration for receiving a WUS from wireless network node 120. That is, terminal device 110 may receive the configuration from wireless network node 120 using first radio entity 210. First radio entity 210 may also transmit an indication to second radio entity 220, wherein the indication may for example indicate when second radio entity is to monitor the wireless channel for the WUS. The indication may, for example, indicate whether second radio entity 220 is to monitor the WUS. The indication may, for example, indicate when second radio entity 220 is to apply the configuration for receiving the WUS from wireless network node 220. Terminal device 110 may then monitor, via second radio entity 220 in terminal device 110, the WUS from wireless network node 120 based on the configuration and the indication from first radio entity 210.

In some example embodiments, second radio entity 220 may acquire the indication from first radio entity 210. Acquiring may refer to some hardware and software implementation in terminal device 110, some communication links between first radio entity 210 and second radio entity 220 or how information is transmitted, e.g., bit streams sent directly through link, or through processor, stored in memory, retrieved by first radio entity 210 or second radio entity 220, etc. For instance, second radio entity 220 may receive the indication from first radio entity 210 via interface 215.

Terminal device 110 may manage, based on the indication, the monitoring of the WUS at second radio entity 220. Managing may refer to some hardware and software implementation in terminal device 110, some communication links between first radio entity 210 and second radio entity 220 or how information is transmitted, e.g., bit streams sent directly through link, or through processor, stored in memory, retrieved by first radio entity 210 or second radio entity 220, etc. For instance, second radio entity 220 may receive the indication from first radio entity 210 via interface 215.

In some example embodiments, first radio entity 210 may signal to second radio entity 220 an on/off command. For example, the indication transmitted by first radio entity 210 to second radio entity 220 over interface 215 may comprise an ON or OFF command. If an"on" command is signaled by first radio network entity 210, second radio entity 220 may initiate monitoring for the WUS. That is, terminal device 110 may initiate, at second radio entity 220, the monitoring of the WUS when the ON command is indicated by the indication, i.e., responsive to receiving the indication comprising the ON command.

Alternatively, if "off" command is signalled by first radio entity 210, second radio entity might not monitor for the WUS. That is, terminal device 110 may skip, at second radio entity 210, the monitoring of the WUS when the OFF command is indicated by another indication, i.e., responsive to receiving said another indication comprising the OFF command. For instance, the OFF command may indicate that monitoring the WUS is to be stopped or suspended, i.e., second radio entity 220 may stop or suspend monitoring the WUS responsive to receiving said another indication. Said another indication may be a subsequent indication compared to the indication, i.e., received after the indication. For instance, skipping may mean that second radio entity 220 does not monitor for the WUS, e.g., for the coming monitoring occasion.

In some example embodiments, first radio entity 210 may provide the configuration for the WUS monitoring for second radio entity 220, for example via interface 215. The configuration for the WUS may be transmitted to first radio entity 210 from wireless network node 120. The configuration for the WUS may comprise at least one of; monitoring occasion information for the WUS or beacon monitoring information for the WUS. The configuration may for example comprise WUS monitoring occasion information, said information possibly further comprising time and/or frequency information for the WUS and/or WUS beacon monitoring. In one example, second radio entity 220 may apply the WUS configuration if first radio entity 210 has signalled the "on" command. In other example, second radio entity 220 may apply WUS configuration when it receives the configuration from first radio entity 210. The configuration for the WUS may be provided to second radio entity 220 by first radio entity 210, e.g., if WUS is supported in a cell of wireless network node 120, like a serving cell of terminal device 110.

In some example embodiments, first radio entity 210 may communicate to second radio entity 220 information indicative of releasing of the configuration. Responsive to receiving said information indicative of releasing of the configuration, second radio entity 220 may stop the monitoring of the WUS based on said information. That is, first radio entity 210 may indicate a release of a WUS configuration to second radio entity 220.

In some example embodiments, said information indicative of releasing of the configuration may be communicated when at least: terminal device 110 performs cell selection or reselection, terminal device 110 transits into CONNECTED mode, INACTIVE mode or IDLE mode or terminal device 110 obtains system information indicating the disabling of wake-up signal. That is, first radio entity 210 may initiate the release of the WUS configuration upon cell (re-)selection, upon entering RRC_CONNECTED or RRC_INACTIVE or RRC_IDLE mode, or upon system information disabling the use of WUS. In some example embodiments, the WUS configuration may be provided to second radio entity 220, e.g., after receiving system information, dedicated signaling, cell (re)selection or a change in a WUS configuration.

In some example embodiments, terminal device 110 may interact, between first radio entity 210 and second radio entity 220, via at least one of Physical, PHY, Medium Access Control, MAC, or Radio Resource Control, RRC, of terminal device 110 or first radio entity 220. That is, first radio entity 210 and second radio entity may interact via PHY MAC or RRC signalling. In general, interaction may refer to communicating.

In some example embodiments, terminal device 110 may interact, between first radio entity 210 and second radio entity 220, via at least one of PHY, MAC or RRC of second radio entity 220 without specifying layer information on second radio entity 220. Alternatively, terminal device 110 may interact, between first radio entity 210 and second radio entity 220, via lower layers or higher layers of terminal device 110 or first radio entity 210. In one example, the PHY, MAC, or RRC of first radio entity 210 may interact with second radio entity while second radio entity 220 might not specify layers. That is, PHY, MAC, or RRC of first radio entity 210 may interact with second radio entity 220, i.e., second radio entity 220 may not be a part of any of these layers.

In some example embodiments, the interactions may be performed when terminal device 110 is in one of IDLE mode, INACTIVE mode, or CONNECTED mode.

Figure 4:
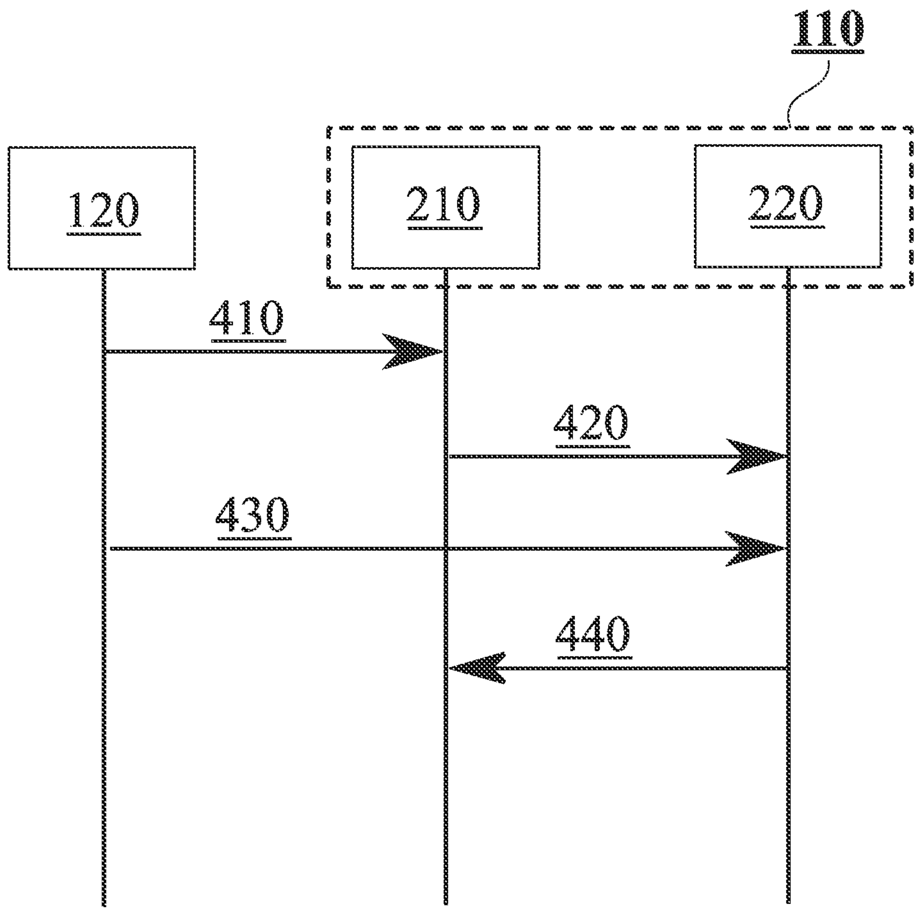
FIG. 4 illustrates a signalling graph in accordance with at least some example embodiments.

FIG. 4 illustrates a signaling graph in accordance with at least some example embodiments. On the vertical axes are disposed, from the left to the right, wireless network node 120 and terminal device 110 of FIG. 1, along with first radio entity 210 and second radio entity 220 of terminal device 110. Time advances from the top towards the bottom.

At step 410, wireless network node 120 may transmit a configuration for a WUS to terminal device 110. The configuration may be received by first radio entity 210 of terminal device 110. At step 420, first radio entity 210 may further transmit the configuration to second radio entity 220. Terminal device 110 may thus obtain the configuration for the WUS from wireless network node 120 via first radio entity 210. First radio entity 210 may also transmit an indication for the WUS to second radio entity 220.

Based on the configuration and the indication, terminal device 110 may determine whether to monitor a wireless channel for the WUS via second radio entity 220. For instance, if the indication for the WUS comprises an "OFF" command, terminal device 110 may determine not to monitor for the WUS via second radio entity 220. Alternatively, if the indication for the WUS comprises an "ON" command, terminal device 110 may determine to monitor for the WUS via second radio entity 220. In some example embodiments, the indication may comprise a time window and/or period for the monitoring. Thus, first radio entity 210 may control monitoring of second radio entity 220 via the indication, e.g., to use less frequent monitoring to save power. In some example embodiments, the indication may be an "ON" command and second radio entity 220 may start monitoring for the WUS based on the indication, i.e., responsive to receiving the indication from first radio entity 210.

At step 430, wireless network node 120 may transmit the WUS to terminal device 110. First radio entity 210 may be in the power-saving state, but second radio entity 220 may monitor the WUS based on the configuration and the indication received from first radio entity 210. Second radio entity 210 may thus receive the WUS from wireless network node 120. At step 440, second radio entity 210 may, responsive to receiving the WUS, transmit a signal to first radio entity 220, to wake up first radio entity 220.

In some example embodiments, first radio entity 210 may transmit, after step 440, another indication to second radio entity 220. Said another indication may comprise an "OFF" command and second radio entity may, responsive to receiving said another indication, stop the monitoring for the WUS. That is, second radio entity 220 may continue monitoring for the WUS until the "OFF" command is indicated by said another indication. Alternatively, second radio entity 220 may continue monitoring for the WUS until a new configuration for the WUS is received from wireless network node 120, possibly via first radio entity 210.

In some example embodiments, the configuration received by first radio entity 210 from wireless network node 120 may be referred to as a first configuration and the configuration received by second radio entity 220 from first radio entity 210 may be referred to as a second configuration.

Example embodiments therefore enable configuring second radio entity 220, like a WUR, for WUS monitoring when needed, thereby reducing power consumption of terminal device 110, like battery saving of a UE.

In some example embodiments, a configuration obtained by first radio entity 210 may be used in configuration provided to second radio entity 220. However, the configuration provided by first radio entity 210 to second radio entity 220 might not necessarily be the same than the configuration obtained by first radio entity 210 from wireless network node 120. The configuration provided to second radio entity 220 may comprise for example obtained information and UE implementation specific information. In some example embodiments, it is also possible that not all the obtained information is provided to second radio entity 220. For instance, highest level of the present disclosure may be that first radio entity 210 configures second radio entity 220 for WUS monitoring and the configuration may comprise obtained information and other information.

Figure 5:
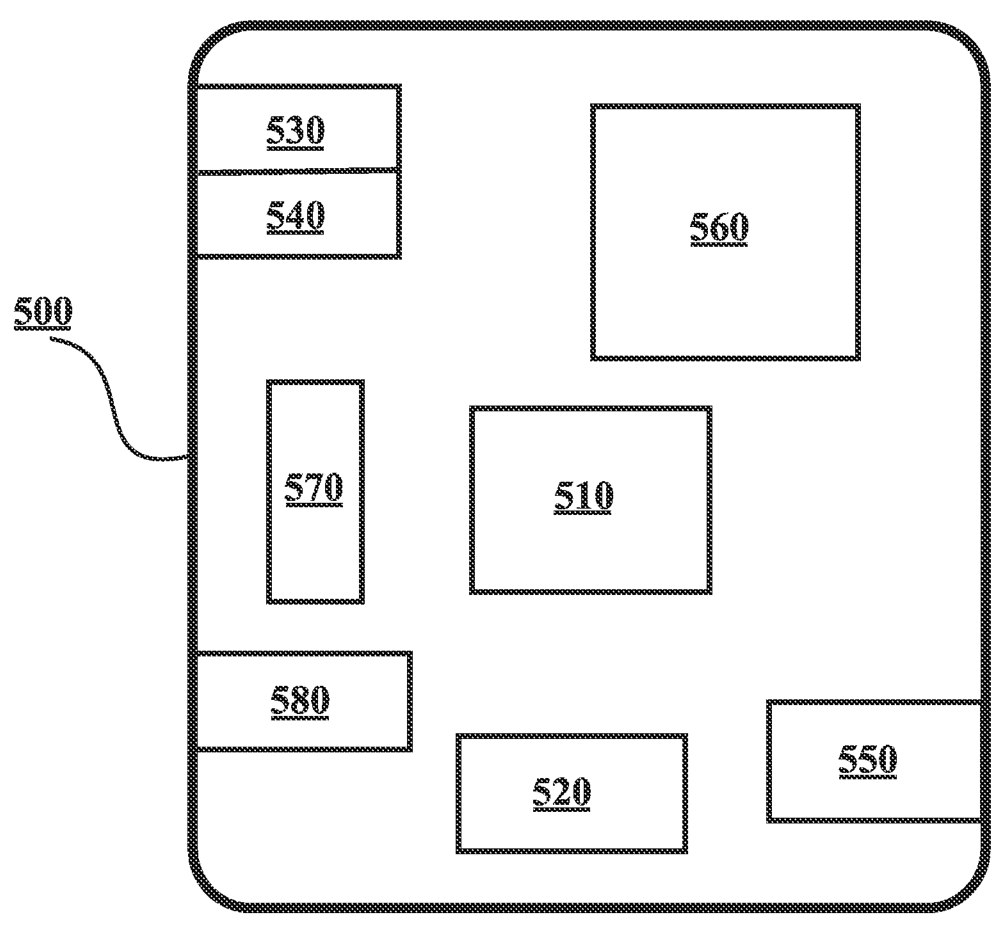
FIG. 5 illustrates an example apparatus capable of supporting at least some example embodiments.

FIG. 5 illustrates an example apparatus capable of supporting at least some example embodiments. Illustrated is device 500, which may comprise, for example, terminal device 110 or wireless network node 120, or a control device configured to control the functioning thereof, possibly when installed therein. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Steamroller processing core produced by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500. Processor 510 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with Global System for Mobile communication, GSM, Wideband Code Division Multiple Access, WCDMA, Long Term Evolution, LTE, and/or 5G/NR standards, for example.

Device 500 may comprise a Near-Field Communication, NFC, transceiver 550. NFC transceiver 550 may support at least one NFC technology, such as Bluetooth, Wibree or similar technologies.

Device 500 may comprise User Interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to accept incoming telephone calls, to originate telephone calls or video calls, to browse the Internet, to manage digital files stored in memory 520 or on a cloud accessible via transmitter 530 and receiver 540, or via NFC transceiver 550, and/or to play games.

Device 500 may comprise or be arranged to accept a user identity module 570. User identity module 570 may comprise, for example, a Subscriber Identity Module, SIM, card installable in device 500. A user identity module 570 may comprise information identifying a subscription of a user of device 500. A user identity module 570 may comprise cryptographic information usable to verify the identity of a user of device 500 and/or to facilitate encryption of communicated information and billing of the user of device 500 for communication effected via device 500.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some example embodiments, device 500 lacks at least one device described above. For example, some devices 500 may lack a NFC transceiver 550 and/or user identity module 570.

Processor 510, memory 520, transmitter 530, receiver 540, NFC transceiver 550, UI 560 and/or user identity module 570 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the example embodiment, various ways of interconnecting at least two of the aforementioned devices may be selected without departing from the scope of the example embodiments.

In some example embodiments, device 500 may comprise receiver 580, like a WUR. Transmitter 530 and receiver 540 may form a transceiver, like an NR transceiver, for communicating while receiver 580 may be for receiving, not for transmitting. The transceiver formed by transmitter 530 and receiver 540 may be referred to as first radio entity 210 and receiver 580 may be referred to as second radio entity 220.

Figure 6:
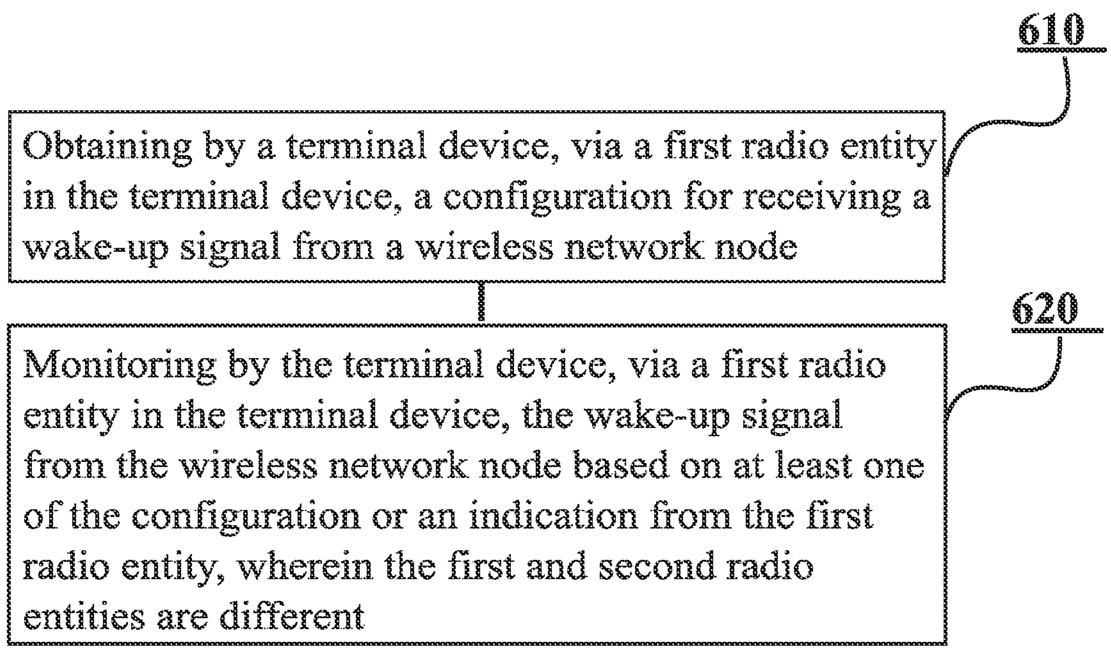
FIG. 6 illustrates a flow graph of a method in accordance with at least some example embodiments.

FIG. 6 is a flow graph of a method in accordance with at least some example embodiments. The steps of the method may be performed by terminal device 110 or by a control device configured to control the functioning thereof, possibly when installed therein.

The method may comprise, at step 610, obtaining by a terminal device, via a first radio entity in the terminal device, a configuration for receiving a wake-up signal from a wireless network node. The method may also comprise, at step 620, monitoring by the terminal device, via a second radio entity in the terminal device, the wake-up signal from the wireless network based on at least one of the configuration or an indication from the first radio entity, wherein the first and second radio entities are different.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, terminal device 110 or wireless network node 120, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, terminal device 110 or wireless network node 120, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the example embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in wireless communication networks, for example in 3GPP networks or WLANs, wherein WUSs and WURs are used.

ACRONYMS LIST

3GPP 3rd Generation Partnership Project
BS Base Station
DCI Downlink Control Information
DU Distributed Unit
eDRX extended Discontinous Reception
GSM Global System for Mobile communication
IAB Integrated Access and Backhaul
IEEE Institute of Electrical and Electronics Engineers
IoT Internet of Things
LTE Long-Term Evolution
M2M Machine-to-Machine
MAC Medium Access Control
MT Mobile Termination
NFC Near-Field Communication
NR New Radio
OOK On-Off Keying
PDCCH Physical Downlink Control Channel
PHY Physical
RAT Radio Access Technology
RRC Radio Resource Control
TRP Transmission and Reception Point
UE User Equipment
UI User Interface
WCDMA Wideband Code Division Multiple Access
WiMAX Worldwide Interoperability for Microwave Access
WLAN Wireless Local Area Network
WUR Wake Up Receiver
WUS Wake-Up Signal

| REFERENCE SIGNS LIST | |
|---|---|
| 110 | Terminal device |
| 115, 125, 135, 215 | Interfaces |
| 120 | Wireless network node |
| 130 | Core network |
| 210 | First radio Entity (e.g., Main Radio) |
| 220 | Second radio Entity (e.g., WUR) |
| 310 | Receive antenna |
| 320 | Band-pass filter |
| 330 | Low-noise amplifier |
| 340 | Envelope detector |
| 350 | Integrator |
| 360 | Comparator |
| 370 | Correlator |
| 380 | Signal |
| 410-440 | Steps in FIG. 4 |
| 500-580 | Structure of the apparatus of FIG. 5 |
| 610-620 | Phases of the method in FIG. 6 |

The invention claimed is:

1. A terminal device, comprising:
at least one processor; and
at least one memory comprising a computer program code;
wherein the at least one memory and the computer program code are configured to, with the at least one processor, cause the terminal device to:
obtain, via a first radio entity in the terminal device, a configuration for receiving a wake-up signal from a wireless network node;
monitor, via a second radio entity in the terminal device, the wake-up signal from the wireless network node based on at least one of a configuration or an indication from the first radio entity, wherein the first and second radio entities are different; and manage, based on the indication, the monitoring of the wake-up signal at the second radio entity.

2. The terminal device according to claim 1, wherein the first radio entity is a main radio of the terminal device for communicating with the wireless network node and the second radio entity is a radio receiver for receiving the wake-up signal from the network.

3. The terminal device according to claim 1, wherein the at least one memory and the computer program code are further configured to, with the at least one processor, cause the terminal device at least to:

acquire, by the second radio entity, the configuration and/or indication from the first radio entity.

4. The terminal device according to claim 1, wherein the indication comprises an ON command.

5. The terminal device according to claim 4, wherein the at least one memory and the computer program code are further configured to, with the at least one processor, cause the terminal device at least to:

initiate, at the second radio entity, the monitoring of the wake-up signal when the ON command is indicated by the indication.

6. The terminal device according to claim 5, wherein the at least one memory and the computer program code are further configured to, with the at least one processor, cause the terminal device at least to:

continue, at the second radio entity, the monitoring of the wake-up signal until an OFF command is indicated by another indication or a new configuration is received.

7. The terminal device according to claim 1, wherein the configuration comprises at least one of:

monitoring occasion information for the wake-up signal;
beacon monitoring information for the wake-up signal; or
synchronization signal information for the wake-up signal.

8. The terminal device according to claim 1, wherein the at least one memory and the computer program code are further configured to, with the at least one processor, cause the terminal device at least to:

communicate, from the first radio entity to the second radio entity, information indicative of releasing of the configuration; and stop, at the second radio entity, the monitoring of the wake-up signal based on the information.

9. The terminal device according to claim 8, wherein the at least one memory and the computer program code are further configured to, with the at least one processor, cause the terminal device at least to:

communicate the information indicative of releasing of the configuration when the terminal device performs at least one of:

cell selection or reselection;
transits into CONNECTED mode, INACTIVE mode or IDLE mode; or
obtains system information indicating the disabling of wake-up signal.

10. The terminal device according to claim 1, wherein the at least one memory and the computer program code are further configured to, with the at least one processor, cause the terminal device at least to:

communicate, between the first radio entity and the second radio entity, via at least one of physical, medium access control or radio resource control layer of the terminal device or the first radio entity; or communicate, between the first radio entity and the second radio entity, via at least one of physical, medium access control or radio resource control layer of the first radio entity without specifying layer information on the second radio entity.

11. The terminal device according to claim 10, wherein the communication is performed when the terminal device is in one of IDLE mode, INACTIVE mode, or CONNECTED mode.

12. The terminal device according to claim 1, wherein the at least one memory and the computer program code are further configured to, with the at least one processor, cause the terminal device at least to:

receive, by the first radio entity, the configuration; and
transmit the configuration from the first radio entity to the second radio entity.

13. A method, comprising:

obtaining by a terminal device, via a first radio entity in the terminal device, a configuration for receiving a wake-up signal from a wireless network node;

monitoring by the terminal device, via a second radio entity in the terminal device, the wake-up signal from the wireless network node based on at least one of a configuration or an indication from the first radio entity, wherein the first and second radio entities are different; and managing, based on the indication, the monitoring of the wake-up signal at the second radio entity.

14. The method according to claim 13, wherein the first radio entity is a main radio of the terminal device for communicating with the wireless network node and the second radio entity is a radio receiver for receiving the wake-up signal from the network.

15. The method according to claim 13, further comprising:

acquiring, by the second radio entity, the configuration and/or indication from the first radio entity.

16. The method according to claim 13, wherein the indication comprises an ON command.

17. The method according to claim 13, further comprising:

receiving, by the first radio entity, the configuration; and
transmitting the configuration from the first radio entity to the second radio entity.

18. A non-transitory computer readable medium having stored thereon a set of computer readable instructions that, when executed by at least one processor, cause a terminal device to at least perform:

obtaining, via a first radio entity, a configuration for receiving a wake-up signal from a wireless network node;

monitoring, via a second radio entity, the wake-up signal from the wireless network node based on at least one of a configuration or an indication from the first radio entity, wherein the first and second radio entities are different; and managing, based on the indication, the monitoring of the wake-up signal at the second radio entity.

* * * * *